Patented Nov. 28, 1950

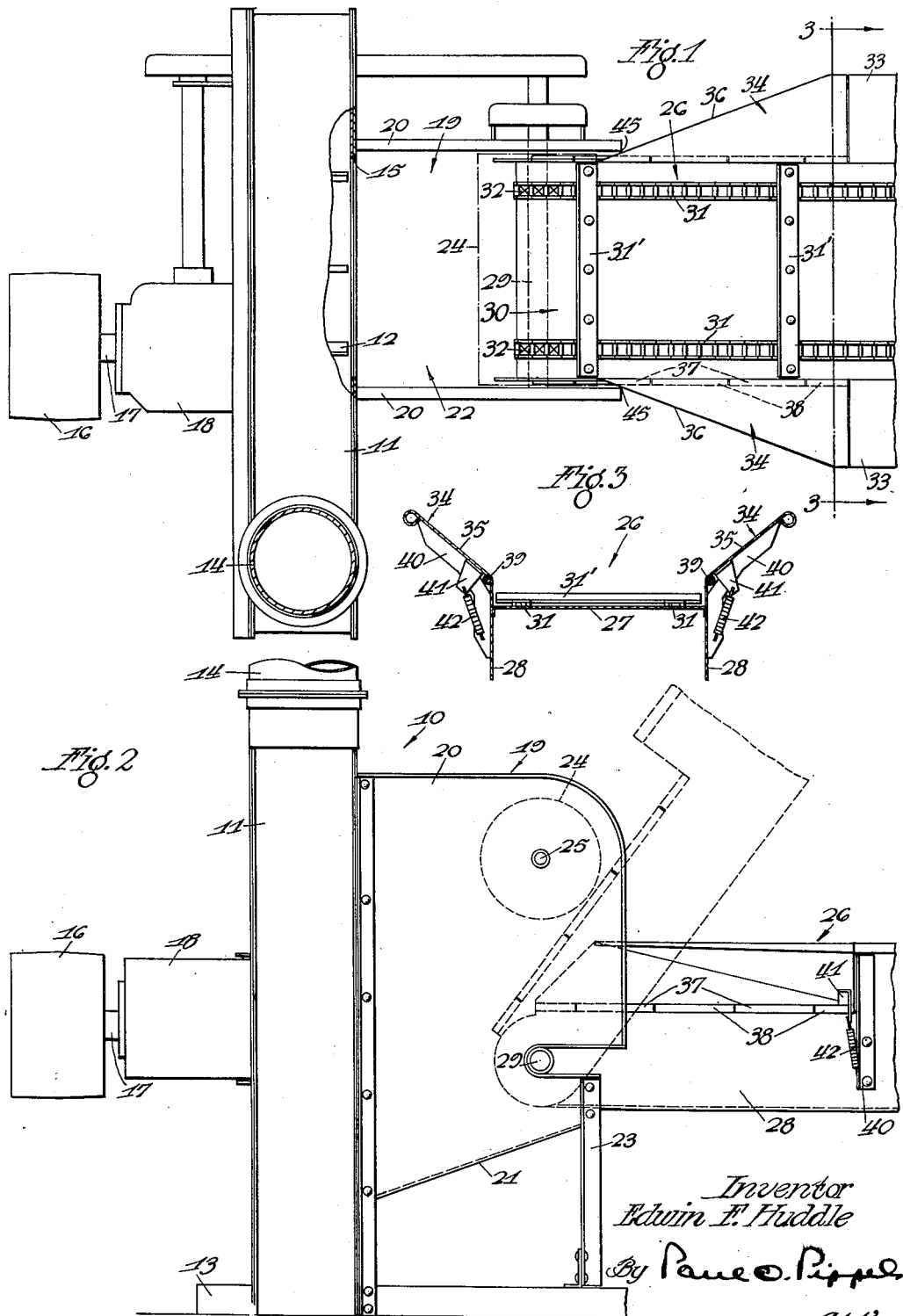

2,532,064

UNITED STATES PATENT OFFICE 2,532,064

ENSILAGE BLOWER HAVING A SWINGING FEED TROUGH

Edwin F. Huddle, Elmwood Park, Ill., assignor to International Harvester Company, a corporation of New Jersey Application December 27, 1946, Serial No. 718,870

10 Claims. (Cl. 302—37)

This invention relates to an improved feed conveying device for an ensilage blower. More specifically, it relates to an improved construction in feed conveying troughs of the type generally used with ensilage blowers.

The type of ensilage blower with which the invention is concerned generally consists of a fan housing or enclosure within which a fan is journaled for rotation. The fan is usually driven by whatever power means is available on the farm such as a power take-off from a tractor, or a stationary engine. A feed opening is provided in one side of the housing and this opening is in communication with a feed hopper or receiving housing. A feed trough is connected to the housing and the feed trough generally includes a movable conveyor which feeds ensilage through an opening to the fan.

The ensilage blower is generally positioned adjacent to a farm silo and has its outlet opening in communication with the upper end of the silo by means of a vertical conduit. When the farmer desires to blow ensilage into the silo, he usually transports ensilage to the blower by means of a farm wagon which is connected to the back end of a tractor. Or he may use a truck. In order for the farmer to unload the contents of the wagon into the feed trough, it is necessary that the farm wagon be driven as close as possible adjacent to the trough. Since the arrangement of the silo and other appurtenances in the farm yard usually prohibits elaborate maneuvering of the tractor and the wagon into the proper position, it is necessary to design the feed trough and arrange the position thereof so that the wagon can be driven adjacent to the trough without the necessity of attempting to back up the wagon or maneuver the same into position. It is found that by hingedly connecting the trough to the feed receiving hopper or housing of the blower, the trough can be swung vertically with respect to said housing and thus be out of the way of the approaching tractor and wagon. In the vertical position of the trough the farmer can drive his wagon adjacent the blower and thereupon lower the feed trough which is then in position immediately adjacent the rear of the wagon box.

The swinging type of feed trough has been found effective to overcome the problems that have been mentioned above. However, in providing a feed trough that can be swung vertically, some advantages had to be sacrificed formerly in the construction of the same. Feed troughs for ensilage blowers are generally provided with upwardly and outwardly extending side boards. These side boards extend outwardly a considerable distance from the body of the feed trough and by virtue of their inclined slope toward the trough serve as guides to funnel the ensilage into the trough during loading of the same. Thus troughs of this type can be loaded with ease. Where the trough is designed so that it can not be swung upwardly, the outward extent of the side boards does not have to be limited other than by limits of practical design. Hence in constructions of this type, the width of the feed trough is of no concern. However, where the feed trough is hingedly connected to the hopper or feed receiving housing of the blower, the width of the trough is necessarily limited by the width of the receiving housing. This is found necessary since the end of the trough projects into the housing and is in telescoping relation therewith when the trough is raised to a vertical out-of-the-way position. Since practical and inexpensive designs dictate that the feed receiving housing is of generally the same size as the feed opening in the fan housing, the feed trough generally cannot be of much greater width. In previous constructions, therefore, it was either necessary to tremendously reduce the width of the feed trough beyond practical limits or to eliminate the side boards, thereby making the trough very difficult to load. It is therefore the prime object of the present invention to provide an improved feed trough construction for an ensilage blower, said trough being of the vertical swinging type and having adjustable side boards that are adapted to engage portions of the receiving housing and are thereby folded out of their normal position when the trough is swung vertically with respect to the receiving housing.

Another object is to provide an improved feed trough construction for an ensilage blower, said trough including hinged side boards that are adapted to fold inwardly into the trough in an out-of-the-way position when the trough is raised with respect to the blower.

Another object is to provide an improved feed trough for an ensilage blower, said trough having upwardly and outwardly extending side boards which are hingedly connected to said trough, said side boards also including inclined edge portions which are adapted to engage portions of the ensilage blower in sliding camming relation when said feed trough is raised vertically with respect to said blower, whereby the hinged side boards will be folded inwardly into the trough in an out-of-the-way position.

Other objects will become more apparent upon a reading of the specification when examined in conjunction with the accompanying drawing, in which:

Figure 1 is a plan view of an ensilage blower having an improved hinged type of feed trough connected thereto;

Figure 2 is a side elevational view of the same; and

Figure 3 is a sectional view taken along the line 3—3 of Figure 1.

An ensilage blower is generally designated by the reference character 10. The ensilage blower includes a fan housing 11, which is best shown in Figure 1, and contains a fan 12. The fan housing 11 is mounted on ground skids 13. A discharge conduit 14 is connected to the upper end of the fan housing 11, said conduit being broken off for the purposes of the present disclosure. This conduit is generally in communication with the upper intake end of a farm silo.

As shown in Figure 1, the fan housing 11 is provided with a feed opening 15 in a vertical side thereof. A belt pulley 16 is connected to a shaft 17. The shaft 17 extends into a gear box 18 containing driving pinions, not shown, for imparting rotary movement to the fan 12.

A receiving hopper or housing generally designated by the reference character 19 is positioned adjacent to the feed opening 15. The housing 19 includes a pair of laterally spaced vertical side members 20. The side members 20 are connected at their lower ends to a sloping bottom portion 21. The vertical side members and the sloping bottom portion cooperate to provide a feed throat 22. The housing 19 is supported on the skids 13 by means of brackets 23. A paddle-type of feed wheel 24, as shown by the dashed lines in Figure 2 and the phantom lines in Figure 1, is positioned within the feed throat 20. The feed wheel 24 is journaled on a shaft 25 carried by the vertical side members 20.

A feed device or trough is generally designated by the reference character 26. The trough 26 includes a bottom portion 27 and vertical side walls 28. The trough 26 is hingedly positioned between the side members 20 by means of a laterally extending shaft 29. By means of this hinge construction the feed trough 26 may be swung vertically within the feed throat 22, as best shown in Figure 2.

An endless conveyor 30 is positioned within the feed trough 26 and includes laterally spaced chains 31. The chains 31 are connected to transversely extending angle members 31' which are supported for longitudinal movement on the bottom portion 27. The chains 31 are driven by means of sprockets 32 which are rigidly keyed to the laterally extending shaft 29.

The feed trough 26 includes stationary side boards 33 and hinged side boards 34. The distance between the outermost edges of the side boards 33 and side boards 34 is greater than the distance across, or width, of the feed throat 22. As best shown in Figure 3, the hinged side boards 34 include upwardly and outwardly extending portions 35. As best shown in Figure 1, the upwardly and outwardly extending portions 35 include angularly inclined edge portions 36 which taper toward the feed throat 22. The hinged side boards 34 are laterally spaced and serve as a guide means for directing material to the feed throat 22. Each side board 34 is provided with hinged portions 37 which mate with hinged portions 38 on the side walls 28. A hinge pin 39 suitably connects the hinged portions 37 and 38.

Each hinged side board is supported in the normal position indicated in Figure 3 by means of an upwardly extending member 40 which is rigidly secured to each side wall 28. A downwardly extending bracket 41 is connected to each hinged side board. A spring 42 is connected to each member 40 and connects the brackets 40 and 41, thereby urging said hinged side members 34 downwardly against the member 40.

The feed trough 26 is generally in the horizontal position indicated in Figure 1 during the operation of the blower. When it is desired to load the feed trough, the farmer first swings the same upward to or beyond the position indicated in Figure 2, thereby placing the trough in an out-of-the-way position so that the farm wagon may be driven up adjacent to the blower. As the farmer swings the feed trough 26 upwardly, the annularly inclined edge portions 36 of the hinged side boards 34 are in sliding camming relation with the vertical members 20 as indicated by the reference character 45. Vertical movement of the trough thereupon causes the edges of the vertical members 20 to fold the hinged side boards 34 inwardly toward the feed trough and the hinged side members are thereupon folded in an out-of-the-way position. As the feed trough is lowered back to its normal position, the hinged side boards are also urged to return to their normal position by means of the springs 42.

It can thus be seen that a unique feed trough construction for an ensilage blower has been provided. The desirable narrow width of the feed throat of the receiving housing 19 has been maintained. The feed trough is constructed so that its end is hinged within the feed housing and is adapted to telescopically be swung into the feed trough upon vertical movement of the trough. Thus the trough can be swung to its desired out-of-the-way position. By virtue of the hinged side board construction shown, the desirable width of the feed trough can be maintained without sacrificing the width of the trough so that it can telescopically engage with the relatively narrow feed throat 22. Thus the hinge side boards 34 perform their desired function, namely, that of funneling the ensilage into the feed trough 22, and also serve to permit loading of the trough in a speedy and efficient manner.

It is to be understood that changes and modifications may be made in this construction which do not depart from the spirit of the invention as disclosed nor the scope thereof as defined by the appended claims.

What is claimed is:

1. In an ensilage blower, a fan housing having a feed opening in a side thereof, a receiving housing communicating with the feed opening and the fan housing, said receiving housing including laterally spaced vertical members, the combination therewith, of a feeding means comprising a longitudinally extending trough, means hingedly connecting said trough to said receiving housing for vertical swinging movement about a transverse axis, and laterally spaced side boards hingedly connected to said trough for movement about longitudinal axes, said side boards having angularly inclined edge portions, the distance between the edge portions being greater than the distance between the vertical members, said edge portions being adapted to engage edges of said vertical members in sliding camming relation during vertical swinging movement of said trough whereby said hinged side boards are folded with respect to said trough.

2. In an ensilage blower, a fan housing having a feed opening in a side thereof, a receiving housing communicating with the fan housing, said receiving housing including a feed throat, the combination therewith of a feeding means including a longitudinally extending trough, means hingedly connecting one end of said trough within said feed throat for vertical swinging movement about a transverse axis, laterally spaced side boards hingedly connected to said trough for movement about longitudinal axes, said side boards extending upwardly and outwardly with respect to said trough and having angularly inclined edge portions terminating within said receiving housing, the distance between said edge portions being greater than the feed throat of the receiving housing, said edge portions being adapted to engage portions of said receiving housing in sliding relation during movement of said trough, whereby said hinged side boards are folded inwardly.

3. In an ensilage blower, a fan housing having a feed opening in a side thereof, a receiving housing communicating with said feed opening, said receiving housing including laterally spaced vertical members, the combination therewith of a feeding means including a longitudinally extending trough having bottom and side walls, means hingedly connecting said trough to said receiving housing for vertical swinging movement about a transverse axis, and laterally spaced inclined side boards hingedly connected to said side walls for movement about longitudinal axes, said side boards having longitudinally extending portions tapering toward and terminating within said receiving housing, edges of said tapering portions being spaced apart a distance greater than the distance between the vertical members and adapted to engage portions of said receiving housing during vertical swinging movement of said trough, whereby said hinged side boards are folded inwardly into said trough.

4. In an ensilage blower, a fan housing having a feed opening in a side thereof, a receiving housing in communication with said feed opening, said receiving housing including laterally spaced vertical members, the combination therewith, of a feeding means including a longitudinally extending trough, means hingedly connecting said trough to said receiving housing for vertical swinging movement about a transverse axis, laterally spaced side boards hingedly connected to said trough for movement about longitudinal axes, said side boards having angularly inclined edge portions, the distance between the edge portions being greater than the distance between the vertical members, said edge portions being adapted to engage edges of said vertical members in sliding camming relation during vertical swinging movement of said trough whereby said hinged side boards are folded inwardly, and resilient means connecting said side boards and said trough for returning said side boards to their normal position upon lowering of said trough.

5. In an ensilage blower, a fan housing having a feed opening in a side thereof, a receiving housing in communication with the feed opening, said receiving housing including laterally spaced vertical members, the combination therewith of a feeding means including a longitudinally extending trough having bottom and side walls, means hingedly connecting said trough to said receiving housing for vertical swinging movement about a transverse axis, and laterally spaced inclined side boards hingedly connected to said trough for movement about longitudinal axes, said side boards having longitudinally extending portions tapering toward and terminating within said receiving housing, edges of said tapering portions being spaced apart a distance greater than the distance between the vertical members and adapted to engage portions of said receiving housing during vertical swinging movement of said trough, whereby said hinged side boards are folded inwardly into said trough.

6. In an ensilage blower, a fan housing having a feed opening in a side thereof, a receiving housing in communication with said feed opening, said receiving housing including laterally spaced vertical members connected by a bottom portion to form a feed throat in communication with said feed opening, the combination therewith of a feeding means in communication with said feed throat, said feeding means including a longitudinally extending trough having bottom and side walls, a feed conveying means within said trough, means hingedly connecting said trough between said vertical members for vertical swinging movement about a transverse axis, and laterally spaced side boards hingedly connected to said side walls for swinging movement about longitudinal axes, said side boards extending upwardly and outwardly with respect to said trough and having angularly inclined edge portions extending toward said feed throat, the edge portions being spaced apart a distance greater than the distance between the vertical members, the edge portions engaging edges of said vertical members in sliding cammed relation during vertical swinging movement of said trough, whereby said hinged side boards are folded inwardly.

7. In an ensilage blower, a fan housing having a feed opening in a side thereof, a receiving housing in communication with said feed opening, said receiving housing including laterally spaced vertical members cooperating to form a relatively narrow feed throat, the combination therewith of a feeding means including a longitudinally extending trough having bottom and side walls, means hingedly connecting said trough between the vertical members of said receiving housing for vertical swinging movement about a transverse axis, and laterally spaced inclined side boards hingedly connected to said vertical walls for movement about longitudinal axes, said side boards having longitudinally extending portions tapering toward and terminating within said feed throat, edges of said tapering portions being spaced apart a distance greater than the width of the feed throat and adapted to engage said vertical members during vertical swinging movement of said trough, whereby said hinged side boards are folded inwardly into said trough.

8. In an ensilage blower, a fan housing having a feed opening in a side thereof, the combination therewith of feeding means adapted to communicate with said fan housing including a longitudinally extending trough, means hingedly connecting said trough for vertical swinging movement, laterally spaced side boards hingedly connected to said trough for movement about longitudinal axes, the distance between outermost edges of said side boards being greater than the width across said feed opening, and means on said housing adapted to engage said side boards in sliding relation during swinging movement of said trough whereby said side boards are folded with respect to said trough.

9. In an ensilage blower, a fan housing having a feed opening in a side thereof, a receiving housing communicating with said fan housing, said receiving housing including laterally spaced vertical members cooperating to form a feed throat, the combination therewith of a feeding means including a longitudinally extending trough, means hingedly connecting said trough between said vertical members for vertical swinging movement about a transverse axis, laterally spaced side boards hingedly connected to said trough for movement about longitudinal axes, said side boards extending upwardly and outwardly with respect to said trough and having angularly inclined edge portions, the distance between the edge portions being greater than the width of said feed throat, said edge portions terminating within said receiving housing and engaging edges of said vertical members in sliding relation during vertical swinging movement of said trough, whereby said hinged side boards are folded inwardly.

10. In an ensilage blower, a fan housing having a feed opening in a side thereof, a receiving housing adjacent said feed opening, said receiving housing including laterally spaced vertical members connected by a bottom portion to form a feed throat in communication with said feed opening, the combination therewith of a feeding means in communication with said feed throat, said feeding means including a longitudinally extending trough having bottom and side walls, a feed conveying means within said trough, means hingedly connecting said trough between said vertical members for vertical swinging movement about a transverse axis, laterally spaced side boards hingedly connected to said side walls for swinging movement about longitudinal axes, said side boards extending upwardly and outwardly with respect to said trough and having angularly inclined edge portions extending into said feed throat, the distance between the edge portions being greater than the width of said feed throat, said portions engaging edges of said vertical members in sliding cammed relation during vertical swinging movement of said trough, whereby said hinged side boards are folded inwardly, and a spring tensionally connecting each side board to said trough for resiliently urging the same to its normal position upon lowering of said trough.

EDWIN F. HUDDLE.

REFERENCES CITED

The following references are of record in the file of this patent:

UNITED STATES PATENTS

| Number | Name | Date |
|--------|------|------|
| 1,490,404 | Ronning et al. | Apr. 15, 1924 |
| 1,900,213 | Wenberg | Mar. 7, 1933 |